(12) United States Patent
Mackenzie et al.

(10) Patent No.: US 11,698,825 B2
(45) Date of Patent: Jul. 11, 2023

(54) APPLICATION PROGRAMMING INTERFACE COMPATIBILITY

(71) Applicant: Red Hat, Inc., Raleigh, NC (US)

(72) Inventors: Andrew D. Mackenzie, Barcelona (ES); Eric Wittmann, Hartford, CT (US)

(73) Assignee: Red Hat, Inc., Raleigh, NC (US)

( * ) Notice: Subject to any disclaimer, the term of this patent is extended or adjusted under 35 U.S.C. 154(b) by 112 days.

(21) Appl. No.: 17/194,982

(22) Filed: Mar. 8, 2021

(65) Prior Publication Data

US 2022/0283885 A1 Sep. 8, 2022

(51) Int. Cl.
*G06F 9/54* (2006.01)
*H04L 67/133* (2022.01)

(52) U.S. Cl.
CPC ............ *G06F 9/547* (2013.01); *H04L 67/133* (2022.05)

(58) Field of Classification Search
CPC ......... G06F 9/541; G06F 9/547; H04L 67/133
See application file for complete search history.

(56) References Cited

U.S. PATENT DOCUMENTS

| | | | |
|---|---|---|---|
| 9,654,334 B2 | 5/2017 | Li et al. | |
| 9,830,146 B2 | 11/2017 | Rector et al. | |
| 10,635,504 B2 | 4/2020 | Rector et al. | |
| 10,956,244 B1* | 3/2021 | Cho | G06F 8/65 |
| 11,228,573 B1* | 1/2022 | Rangasamy | H04L 12/40006 |
| 2014/0351316 A1* | 11/2014 | Boubez | H04L 63/08 709/218 |
| 2017/0102976 A1* | 4/2017 | Nandakumar | G06F 9/547 |
| 2019/0196842 A1* | 6/2019 | Horikoshi | G06F 21/62 |
| 2021/0216308 A1* | 7/2021 | Vyas | G06N 20/00 |
| 2021/0279115 A1* | 9/2021 | Aspro | G06F 8/30 |
| 2021/0382764 A1* | 12/2021 | Coutinho Moraes | H04L 67/565 |
| 2022/0012118 A1* | 1/2022 | Kelly | G06F 16/9535 |
| 2022/0116480 A1* | 4/2022 | Crisan | H04L 67/01 |

(Continued)

OTHER PUBLICATIONS

Li et al. "Compatibility Checking of Rest API Based on Coloured Petri Net" (May 20-22, 2015), Web Information Systems and Technologies, WEBIST 2015, Springer International Publishing, pp. 22-43 [retrieved from https://link.springer.com/content/pdf/10.1007/978-3-319-30996-5.pdf], (Year: 2015).*

(Continued)

*Primary Examiner* — Brian W Wathen
(74) *Attorney, Agent, or Firm* — K&L Gates LLP

(57) ABSTRACT

A system, comprising a memory and a processor, where the processor is in communication with the memory, is configured to receive a request to determine a compatibility of a first version of an application programming interface (API) with a second version of the API. Next, a model of the first version of the API and a model of the second version of the API is retrieved. Each of the models is parsed to determine a first set of functionality of the first version of the API and a second set of functionality of the second version of the API. The first set of functionality is mapped to the second set of functionality to determine differences between the first set of functionality and the second set of functionality. The compatibility of the first version of the API with the second version of the API is determined based on the differences.

18 Claims, 4 Drawing Sheets

(56) References Cited

U.S. PATENT DOCUMENTS

2022/0197606 A1* 6/2022 Rodgers .................. G06F 9/541
2022/0261299 A1* 8/2022 Dhondse ................ G06N 20/00

OTHER PUBLICATIONS

Cremaschi et al., "Toward Automatic Semantic API Descriptions to Support Services Composition", Department of nformatics, Systems and Communication,University of Milan—Bicocca, Italy (2017) pp. 159-167.

Serano et al., "Semantics-based API discovery, Matching and Composition with Linked Metadata", Department of Computing Science, University of Alberta, Service Oriented Computing and Applications, https://doi.org/10.1007/s11761-020-00301-1, 14 pages; published Sep. 22, 2020.

Peng et al., "Using Tag based Semantic Annotation to Empower Client and REST Service Interaction", Department of Creative Technologies, Blekinge Institute of Technology, Karlskrona, Sweden (2018), 9 pages.

Lübke et al., "Interface Evolution Patterns—Balancing Compatibility and Extensibility across Service Life Cycles", EuroPLoP '19, Jul. 3-7, 2019, Irsee, Germany, 24 pages.

* cited by examiner

APPLICATION PROGRAMMING INTERFACE COMPATIBILITY

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for determining a compatibility between application programming interfaces. In an example, a method includes receiving a request to determine a compatibility of a first version of an application programming interface (API) with a second version of the API. Next, a model of the first version of the API and a model of the second version of the API is retrieved. Each of the models are parsed to determine a first set of functionality of the first version of the API and a second set of functionality of the second version of the API. The first set of functionality is mapped to the second set of functionality to determine differences between the first set of functionality and the second set of functionality. Next, the compatibility of the first version of the API with the second version of the API is determined based on the differences.

In an example, a system, comprising a memory and a processor, where the processor is in communication with the memory, is configured to receive a request to determine a compatibility of a first version of an application programming interface (API) with a second version of the API. Next, a model of the first version of the API and a model of the second version of the API is retrieved. Each of the models is parsed to determine a first set of functionality of the first version of the API and a second set of functionality of the second version of the API. The first set of functionality is mapped to the second set of functionality to determine differences between the first set of functionality and the second set of functionality. The compatibility of the first version of the API with the second version of the API is determined based on the differences.

In an example, a non-transitory machine readable medium storing code, which when executed by a processor, is configured to receive a request to determine a compatibility of a first version of an application programming interface (API) with a second version of the API. Next, a model of the first version of the API and a model of the second version of the API is retrieved. Each of the models is parsed to determine a first set of functionality of the first version of the API and a second set of functionality of the second version of the API. The first set of functionality is mapped to the second set of functionality to determine differences between the first set of functionality and the second set of functionality. Next, the compatibility of the first version of the API with the second version of the API is determined based on the differences.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
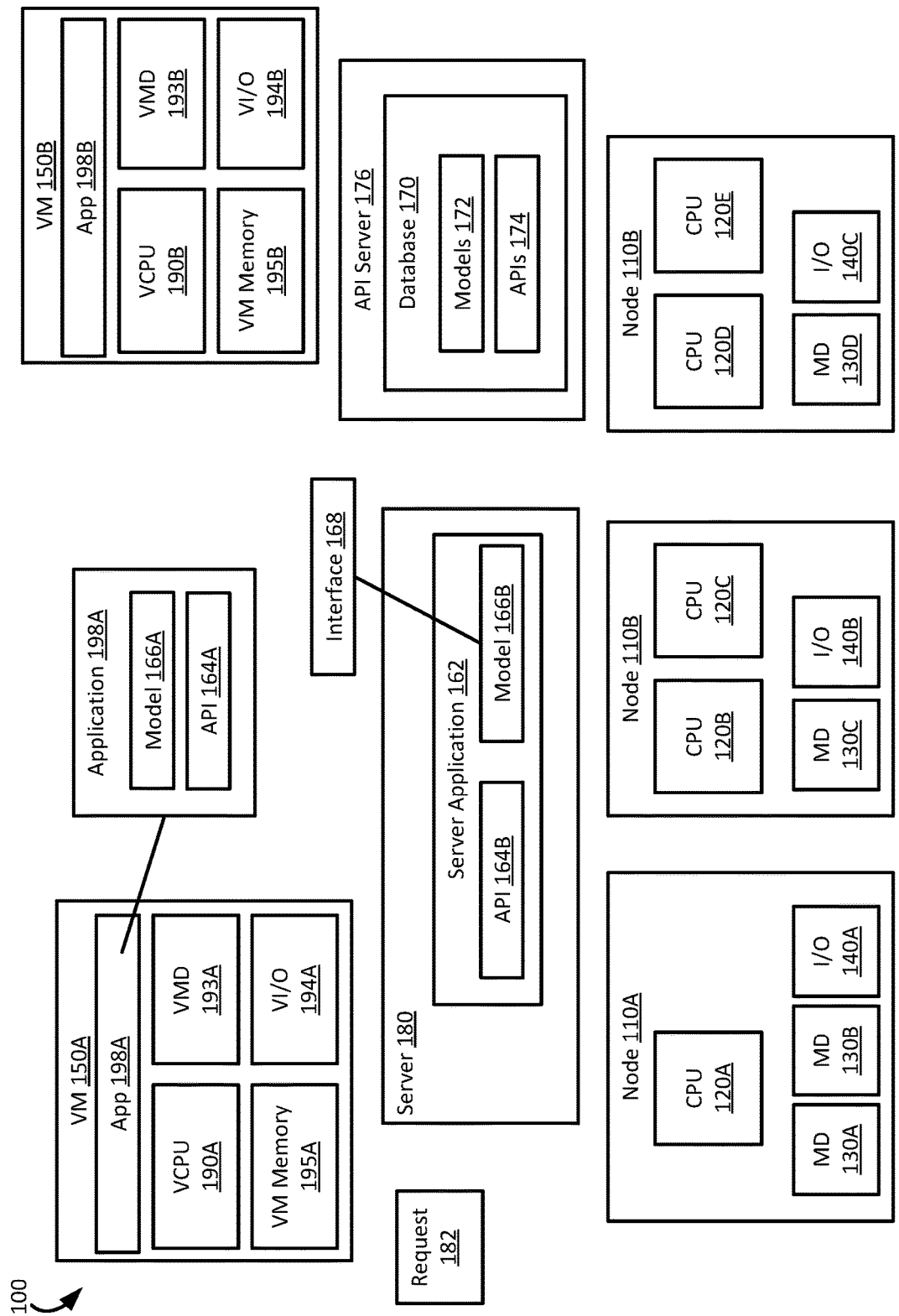
FIG. 1 illustrates a high level component diagram of an example computing system in accordance with one or more aspects of the present disclosure.

Techniques are disclosed for providing a capability of determining a compatibility between application programming interfaces. Typically, client applications communicate with server applications by incorporating an application programming interface (API) that provides definitions and/or protocols by which the application sends and/or receives information to and from the server application. Generally, a client application incorporates a software development kit (SDK) generated (or manually written) for a specific version of an API of a server application. Often, as a server application's API evolves over time, a client's SDK may become outdated with respect to the server application's API causing a client application to become incompatible with the server application.

Typically, standard semantic versioning rules are applied to determine a compatibility of two different interfaces. Generally, a semantic versioning specification dictates a format of an API version number. Typically, a version number is formatted to indicate whether a change to an API is major, minor, or a patch (e.g., API version 4.3.1 means there have been 4 major revisions, 3 minor revisions to the last major revision, and 1 patch to the last major revision). Traditionally, a major revision includes changes that make an API incompatible with other versions of the API. Generally, a minor revision adds functionality in a backwards compatible manner and a patch version includes backwards compatible bug fixes. Typically, major revisions require extensive modifications and/or an updates to a client application's API to be functional, and these updates often cause the client application to have extended downtime for installation and testing of the new API. However, in some instances, a client application's API may not need to be modified or updated to still function with a server application's API when the client application's API does not conflict with a currently installed version of the server application's API, and thus, updates for client application's APIs are often wasting valuable processing time attempting to align versions of the API unnecessarily.

As described in various examples disclosed herein, to facilitate determining whether a client application API and a server application API are compatible, the systems and methods disclosed herein advantageously analyzes models of a client application's API and a server application's API to determine whether each API provides an expected functionality and/or interface independent of differences indicated semantic versioning of each API. Analysis of each respective model allows more flexibility in version numbering (not constrained to semantic versioning) and also provides more granularity when checking whether a client is compatible with a server. In various implementations, an application and/or an application programming interface (API) server may analyze a client API and server API to determine, at a functional level, whether the client API and the server API are compatible. In certain implementations, API compatibility may be determined by analyzing a model associated with each API to determine which functions may be exposed by each API and what inputs and/or outputs may be expected from each respective function. In these instances, if functionality and expected inputs and/or outputs of both a client API and a server API correspond, a client API may be compatible with a server API and vice versa without regard to differences other differences in each API or versioning. In some embodiments, a client and/or a server may be encoded with a model of their respective API. In certain embodiments, a model may be an encoded description of an API (e.g., an Open API definition, XML file). In various implementations, an analysis module to determine compatibility between two API models may be located within a client, server, and/or within a third party server and/or application.

FIG. 1 depicts a high-level component diagram of an example computing system 100 in accordance with one or more aspects of the present disclosure. The computing system 100 may include a server 180, an API server 176, one or more virtual machines (VM 150A-B, 150 generally), and nodes (e.g., nodes 110A-C, 110 generally). The server 180 may execute and/or run a server application 162 which includes an API 164B and a model 166B. In some implementations, a server application 162 may provide access to the model 166B through an interface 168 (e.g., a REST interface, http interface, ftp interface, and/or other interfaces). In certain implementations, a server application 162 or an application 198 may receive a request 182 to initiate an analysis of APIs 164A and 164B. An API server 176 may include a database 170 holding APIs 174 and models 172. In most implementations, a model (e.g., models 172 and 166A-B, 166 generally) may include a description of a specific API (e.g., APIs 174, 164A-B, 164 generally). In various implementations, a model may include each function from an associated API, including expected inputs and/or outputs to and from each respective function.

Virtual machines 150A-B may include a virtual machine memory (VM Memory), a virtual CPU (VCPU), virtual memory devices (VIVID), and virtual input/output devices (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, Applications 198A-B may be different applications or services. In another example, applications 198A-B may be different instances of the same application or service.

In an example, a virtual machine 150A may execute a guest operating system and run applications 198A-B which may utilize the underlying VCPU 190A, VMD 193A, and VI/O device 194A. One or more applications 198A-B may be running on a virtual machine 150A under the respective guest operating system. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 170A may be independent of the underlying hardware and/or OS. For example, application 198A run on a first virtual machine 150A may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS.

In an example, virtual machines 150A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-B or services (e.g., microservices) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
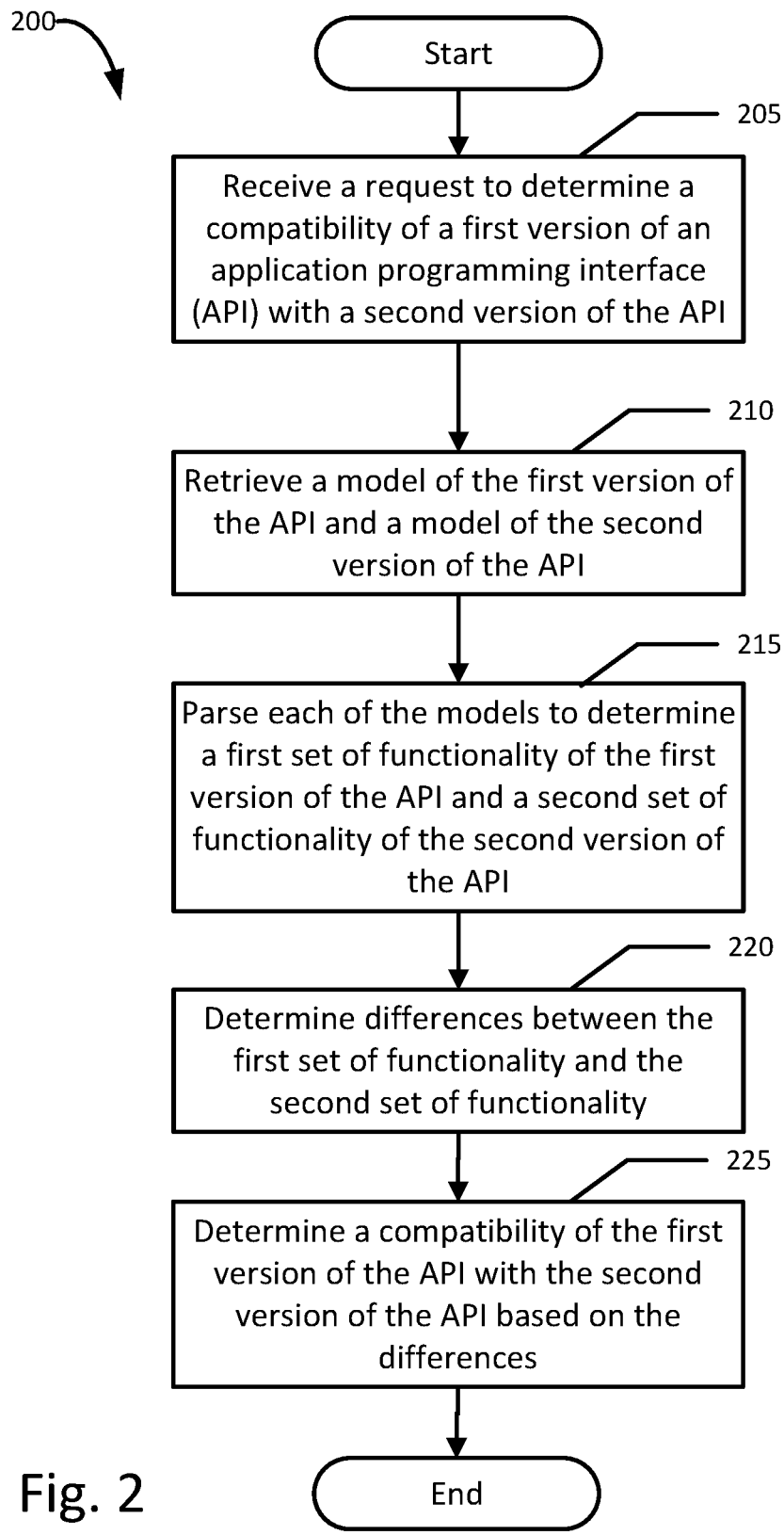
FIG. 2 illustrates a flowchart of an example method of determining a compatibility of an application programming interface (API) according to an example embodiment of the present disclosure.

FIG. 2 illustrates a flowchart of an example method of determining a compatibility of an application programming interface, in accordance with an embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, blocks may be repeated and some of the blocks described are optional. The method 200 may be performed by processing logic that may comprise hardware (circuitry, dedicated logic, etc.), software, or a combination of both.

As shown in FIG. 2, an example method 200 may begin with receiving a request to determine a compatibility of a first version of an application programming interface (API) with a second version of the API (block 205). Application 198A may interface with API 164B of server application 162 using API 164A. Application 198A may send a request 182 to server application 162 to determine a compatibility of API 164A with API 164B. For example, in some implementations, a client API and server API may be compatible if functions actively used by a client and/or a server are fully supported by each respective API (e.g., a server API includes functionality for 'get', 'set', and 'add' but a client API solely uses 'add', the server API and client API may be compatible). In an alternate example, an application (application 198A) may have an incompatible interface (e.g., API 164A) to communicate with an interface (e.g., API 164B) of a cloud storage application (e.g., server application 162). In this example, API 164A may not be a same version as API 164B (e.g., a retrieve function may have a different set of inputs and/or outputs depending on an API). Next, the example method 200 may include retrieving a model of the first version of the API and a model of the second version of the API (block 210). For example, a server application (e.g., application 162) analyzing a compatibility of two APIs (e.g., API 164A and 164B) may retrieve a model (e.g., model 166A) associated with a client API (e.g., API 164A) and analyze the model (e.g., model 166A) with respect to its own model (e.g., model 166B). In various implementations, a server application or client application may incorporate a model (e.g., model 166B or 166A) within the respective application. In some implementations, an analyzing application (e.g., server application 162 or application 198A) may retrieve a requested model from an API server (e.g., from a database 170 on API server 176). In certain implementations, a client application (e.g., application 198A) may request a model of a server application API via an interface (e.g., an http interface) where analysis of each API (e.g., API 164A and 164B) is completed at the client application.

Next, the example method 200 may include parsing each of the models to determine a first set of functionality of the first version of the API and the second set of functionality of the second version of the API (block 215). Server application 162 may parse models 166A and 166B to determine functionality for both model 166A and model 166B. Next, the example method 200 may include determining differences between the first set of functionality and the second set of functionality (block 220). For example, after parsing model 166A and model 166B for a first set of functionality and a second set of functionality, the server application 162 may compare the first set of functionality and the second set of functionality to determine differences (e.g., a set of differences, functions that exist in a first API and do not exist in a second API, functions with differing inputs and/or outputs) between model 166A and model 166B.

Next, the example method 200 may include determining a compatibility of the first version of the API and the second version of the API based on the differences (block 225). For example, analysis of models of two APIs (e.g., model 166A and model 166B) may result in a set of compatibility differences between the two APIs. Each difference may be classified with a compatibility level indicating whether the difference represents a backwards or forwards compatibility violation. In certain implementations, each difference may contain contextual information about which part of an API it came from (e.g., a REST endpoint) and may contain details about the operation (e.g., a name of an operation and/or inputs and outputs of the operation). In some implementations, a compatibility level and contextual information may be used by an application (e.g., application 198A) to produce a filtered set of differences that may be used to make fine-grained decisions about whether a given client API (e.g. API 164A) may be compatible with a server API (e.g., API 164B) for the purposes of the application (e.g., application 198A). In various implementations, an application (e.g., Application 198A) may qualify and/or negotiate its compatibility by modifying a granularity of an analysis (e.g., limiting a scope of functionality checked). For example, a client (e.g., application 198A) may limit and/or designate a scope of analysis to an 'amend' function with specified inputs and/or outputs. In this instance, as long as a server API (e.g., API 164B) includes an 'amend' function with the same specified inputs and/or outputs, the server API (e.g., API 164B) may be compatible with the client API (e.g., API 164A). In certain implementations, a client application API (e.g., 164A) may not require an update to still be functional with a server application API (e.g., API 164B) when the client application API is compatible with the server application API.

In various implementations, a client application (e.g., application 198A) may request (e.g., request 182) and/or retrieve a model (e.g., 166B) from a server application (e.g., server application 162) via an interface (e.g., interface 168) to proceed with analysis of the models at the client application (e.g., 198A). In other implementations, a client application (e.g., application 198A) may send a request (e.g., request 182) for a server application (e.g., server application 162) to analyze each API (e.g., APIs 164A and 164B).

Figure 3:
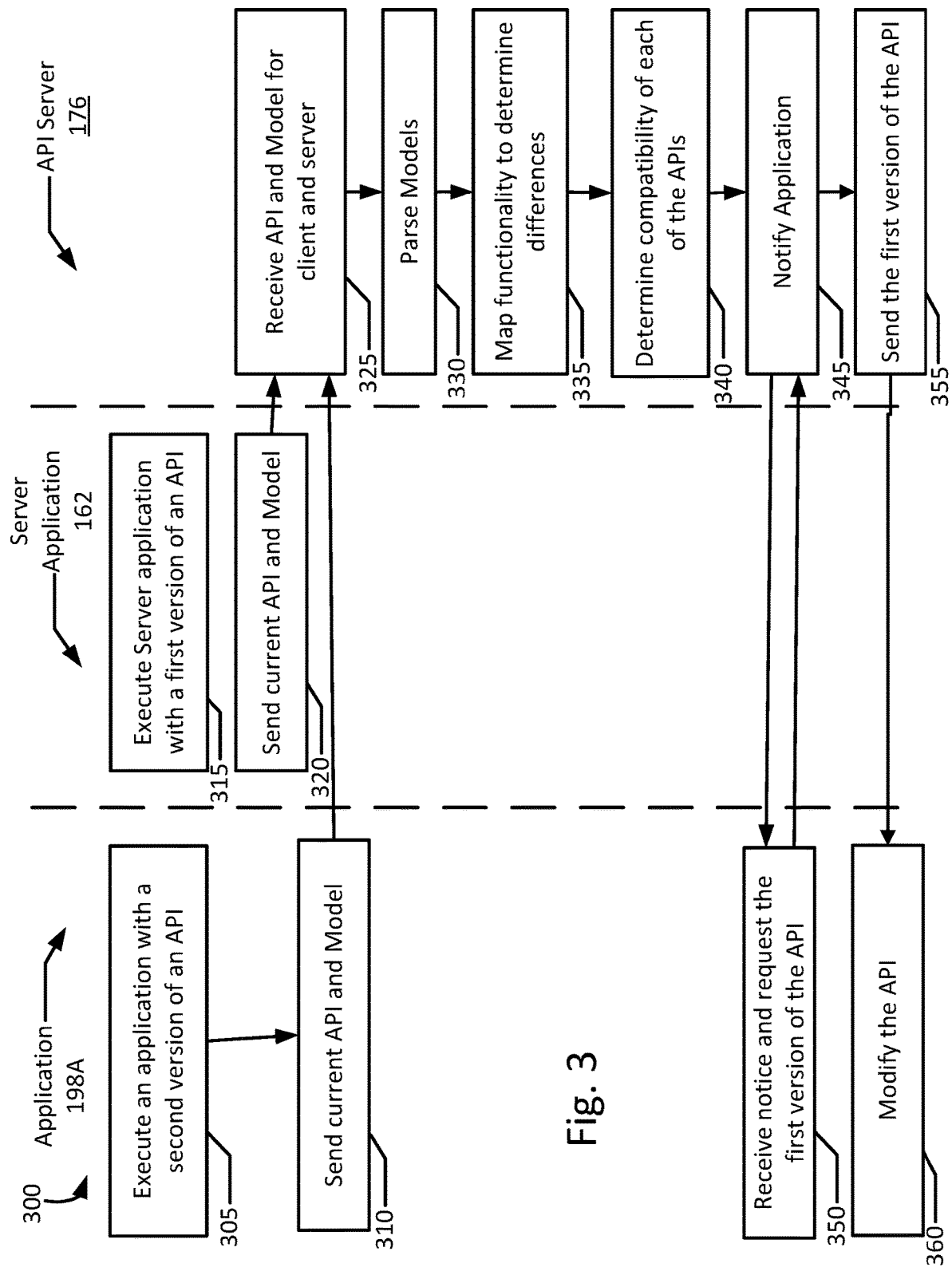
FIG. 3 illustrates a flow diagram of example methods of determining a compatibility of an application programming interface (API) via an API server, in accordance with an embodiment of the present disclosure.

FIG. 3 illustrates a flow diagram of an example methods of determining a compatibility of an application programming interface (API), in accordance with an embodiment of the present disclosure. Although the example method 300 is described with reference to the flow diagram illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. For example, in the illustrated flow diagram, an application 198A and a server application 162 are in communication with an API server 176 to determine whether API 164A is compatible with API 164B, which may allowing application 198A to communicate with server application 162.

As shown in FIG. 3, application 198A executes with a second version of an API 164A (block 305) and a server application 162 executes with a first version of an API 164B (block 315). For example, a cloud data storage client (e.g., application 198A) is attempting to communicate with a cloud storage provider (e.g., server application 162). Initially, the server application 162 sends a current API 164B and model 166B describing the API 164B to an API server 176 (block 320). Application 198A also sends a current version of an API 164A and model 166A describing the API 164A to an API server 176 (block 310). In various implementations, an API server (e.g., API server 176) may include a database 170 including one or more APIs 174 and associated models 172. In certain implementations, an application (e.g., application 198A or server application 162) may send a version number of an API stored within the database 170 and depend on the database 170 for retrieving each model from a selection of models 172 already stored within the database 170. The API server 176 receives the APIs (e.g., API 164A and 164B) and models (e.g., model 166A and 166B) from the application 198A and server application 162 (block 325). The API server 176 parses each of the models (e.g., API 166A and 166B) (block 330) and maps functionality between the first version of the API 164B with the second version of the API 164A (block 335). In various implementations, an API server (e.g., API server 176) and/or an analyzing application (e.g., application 198A or server application 162) may create a set of differences indicating what differences exist and/or where each difference originates (e.g., which function and/or portion of an interface or library). In various implementations, differences may include changes to expected inputs or changes to expected outputs. In certain implementations, a difference may include an addition and/or removal of one or more functions of an API between versions of the API. In some instances, a difference may also indicate a location where the change and/or difference may be located within an API.

Referring to the example shown in FIG. 3, the API server (e.g., API server 176) may determine a compatibility of the first version of the API and the second version of the API based on the differences (block 340). For example, a client application may use an API (e.g., API 164A) to gain access to a software as a service (Saas) (e.g., word processing, spreadsheets, etc.). In this instance, the client's API may include and/or utilize an "open" and "close" functionality and the server application may incorporate a different version of an API (e.g., API 164B) which includes an "open", "close", "edit", and "save" functionality. In this instance, as long as the server application's API fully supports the same "open" and "close" functionality as the client's API, the client's API may be compatible with the server's API. In an alternate example, a client application may use an API (e.g., API 164A) to gain access to a virtual machine. In this instance, if any function called by the client application or any input provided to that function is different than expected by the server application's API, the client's API may be incompatible with the server application's API. In various implementations, if an API is incompatible, an application may modify its own client API to align with a corresponding server application API.

Referring to the example of FIG. 3, the API server 176 determines that the second version of the API (e.g., API 164A) is incompatible and notifies the application 198A (block 345). In various implementations, an application and/or API server may indicate whether an API (e.g., APIs 164A or 164B) are compatible. Upon receiving notification at the application 198A, the application 198A requests the first version of the API 164B from the API server 176 (block 350). Next, the API server 176 sends the first version of the API (e.g., 164A) from APIs 174 within database 176 (block 355). In various implementations, an API server 176 may store software development kits for each respective API (e.g., API 174, 164A, 164B). In certain implementations, an application (e.g., application 198A) may install and/or incorporate a modified API into the application.

Figure 4:
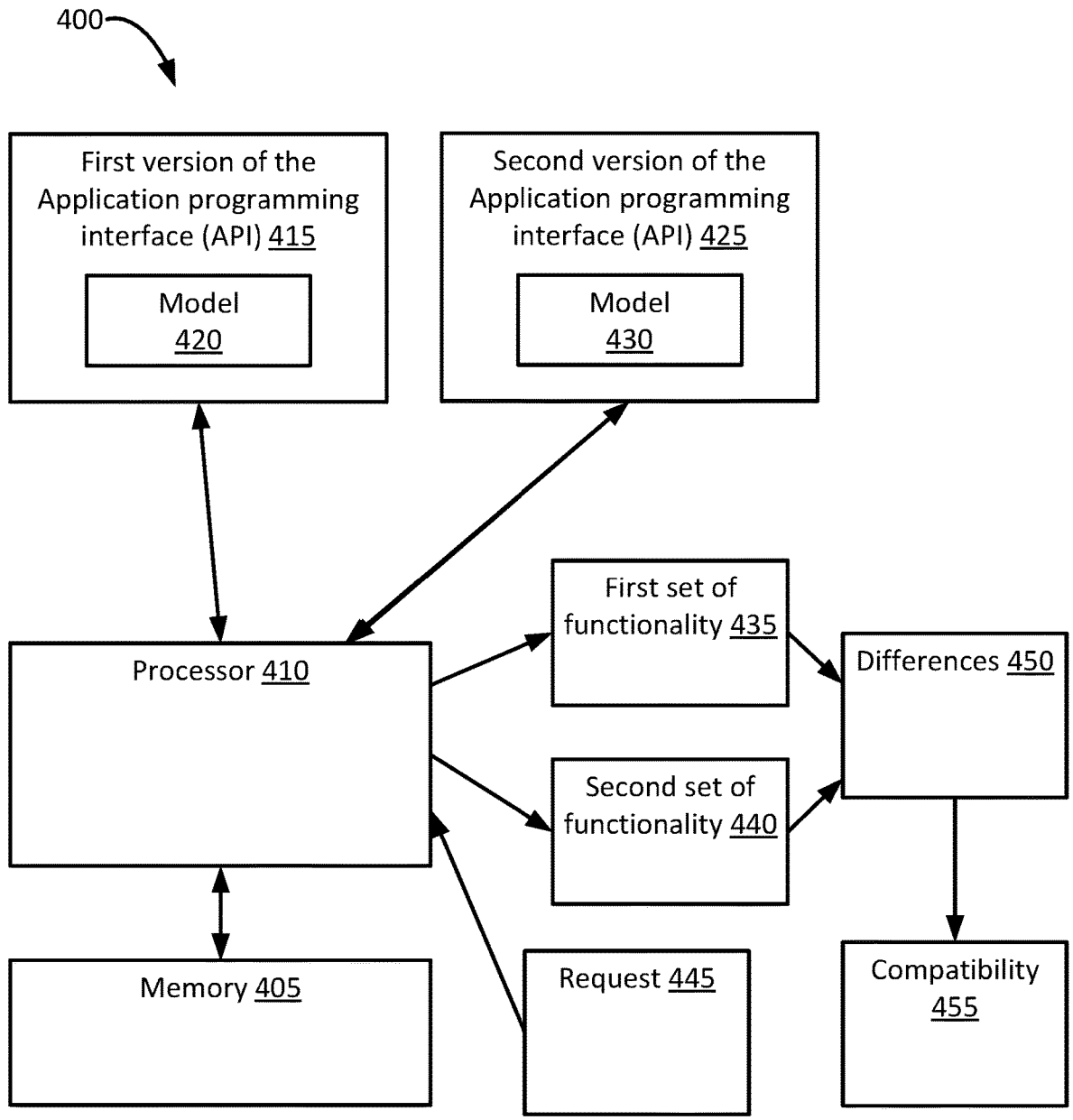
FIG. 4 illustrates a block diagram of an example system determining compatibility of APIs according to an example embodiment of the present disclosure.

FIG. 4 is a block diagram of system 400 which includes memory 505 and processor 410. The processor 410 is in communication with the memory 405. The processor 410 is configured to receive a request 445 to determine a compatibility 455 of a first version of an application programming interface (API) 415 with a second version of the API 425. A model 420 of the first version of the API 415 and a model 430 of the second version of the API 425 are retrieved. Each of the models 420 and 430 are parsed to determine a first set of functionality 435 of the first version of the API 415 and a second set of functionality 440 of the second version of the API 425. The first set of functionality 435 is mapped to the second set of functionality 440 to determine differences 450 between the first set of functionality 435 and the second set of functionality 440. A compatibility 455 of the first version of the API 415 with the second version of the API 430 is determined based on the differences 450

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and
a processor in communication with the memory, wherein the processor is configured to:
receive a request to determine a compatibility of a first version of an application programming interface (API) with a second version of the API;
retrieve a model of the first version of the API and a model of the second version of the API;
parse each of the models to determine a first set of functionality of the first version of the API and a second set of functionality of the second version of the API;
map the first set of functionality to the second set of functionality to determine differences between the first set of functionality and the second set of functionality; and
determine the compatibility of the first version of the API with the second version of the API based on the differences;
modify the second version of the API responsive to determining that the first version of the API and the second version of the API are incompatible, wherein modifying the second version of the API comprises:
retrieving an installation package of the first version of the API; and
executing the installation package to transform the second version of the API to the first version of the API.

2. The system of claim 1, wherein the request includes a required set of functionality, wherein the required set of functionality is a subset of the second set of functionality.

3. The system of claim 2, wherein determining the compatibility includes verifying inclusion of the required set of functionality in the first set of functionality.

4. The system of claim 1, wherein each model is retrieved from a server storing a plurality of versions of the API and associated models within a database.

5. The system of claim 1, wherein the model of the second version of the API is retrieved from a client application.

6. The system of claim 1, wherein the model of the first version of the API is retrieved from a server application.

7. The system of claim 1, wherein the model of the first version of the API is provided via an http interface.

8. The system of claim 1, wherein the processor is further configured to:
upon determining that the first version of the API and the second version of the API are compatible, sending a response to the request indicating that the first version of the API is compatible with the second version of the API.

9. The system of claim 1, wherein differences includes a change to expected inputs or outputs of the first API.

10. The system of claim 1, wherein differences includes an addition or a removal of a function from the first API.

11. A method, comprising:
receiving a request to determine a compatibility of a first version of an application programming interface (API) with a second version of the API;
retrieving a model of the first version of the API and a model of the second version of the API;
parsing each of the models to determine a first set of functionality of the first version of the API and a second set of functionality of the second version of the API;
mapping the first set of functionality to the second set of functionality to determine differences between the first set of functionality and the second set of functionality; and
determining the compatibility of the first version of the API with the second version of the API based on the differences
modifying the second version of the API responsive to determining that the first version of the API and the second version of the API are incompatible, wherein modifying the second version of the API comprises:
retrieving an installation package of the first version of the API; and
executing the installation package to transform the second version of the API to the first version of the API.

12. The method of claim 11, wherein the request includes a required set of functionality, wherein the required set of functionality is a subset of the second set of functionality.

13. The method of claim 12, wherein determining the compatibility includes verifying inclusion of the required set of functionality in the first set of functionality.

14. The method of claim 11, wherein each model is retrieved from a server storing a plurality of versions of the API and associated models within a database.

15. A non-transitory machine readable medium storing code, which when executed by a processor is configured to:
receive a request to determine a compatibility of a first version of an application programming interface (API) with a second version of the API;
retrieve a model of the first version of the API and a model of the second version of the API;
parse each of the models to determine a first set of functionality of the first version of the API and a second set of functionality of the second version of the API;
map the first set of functionality to the second set of functionality to determine differences between the first set of functionality and the second set of functionality; and
determine the compatibility of the first version of the API with the second version of the API based on the differences;
modify the second version of the API responsive to determining that the first version of the API and the second version of the API are incompatible, wherein modifying the second version of the API comprises:
retrieving an installation package of the first version of the API; and
executing the installation package to transform the second version of the API to the first version of the API.

16. The non-transitory machine readable medium of claim 15, wherein the request includes a required set of functionality, wherein the required set of functionality is a subset of the second set of functionality.

17. The non-transitory machine readable medium of claim 16, wherein determining the compatibility includes verifying inclusion of the required set of functionality in the first set of functionality.

18. The non-transitory machine readable medium of claim 15, wherein each model is retrieved from a server storing a plurality of versions of the API and associated models within a database.

* * * * *